April 21, 1936. F. HARVEY 2,038,107
ELECTRICAL CONNECTION FOR BUS BARS
Filed July 31, 1933 2 Sheets-Sheet 1

INVENTOR
FRANK HARVEY,
BY
ATTORNEY

April 21, 1936.  F. HARVEY  2,038,107
ELECTRICAL CONNECTION FOR BUS BARS
Filed July 31, 1933  2 Sheets-Sheet 2
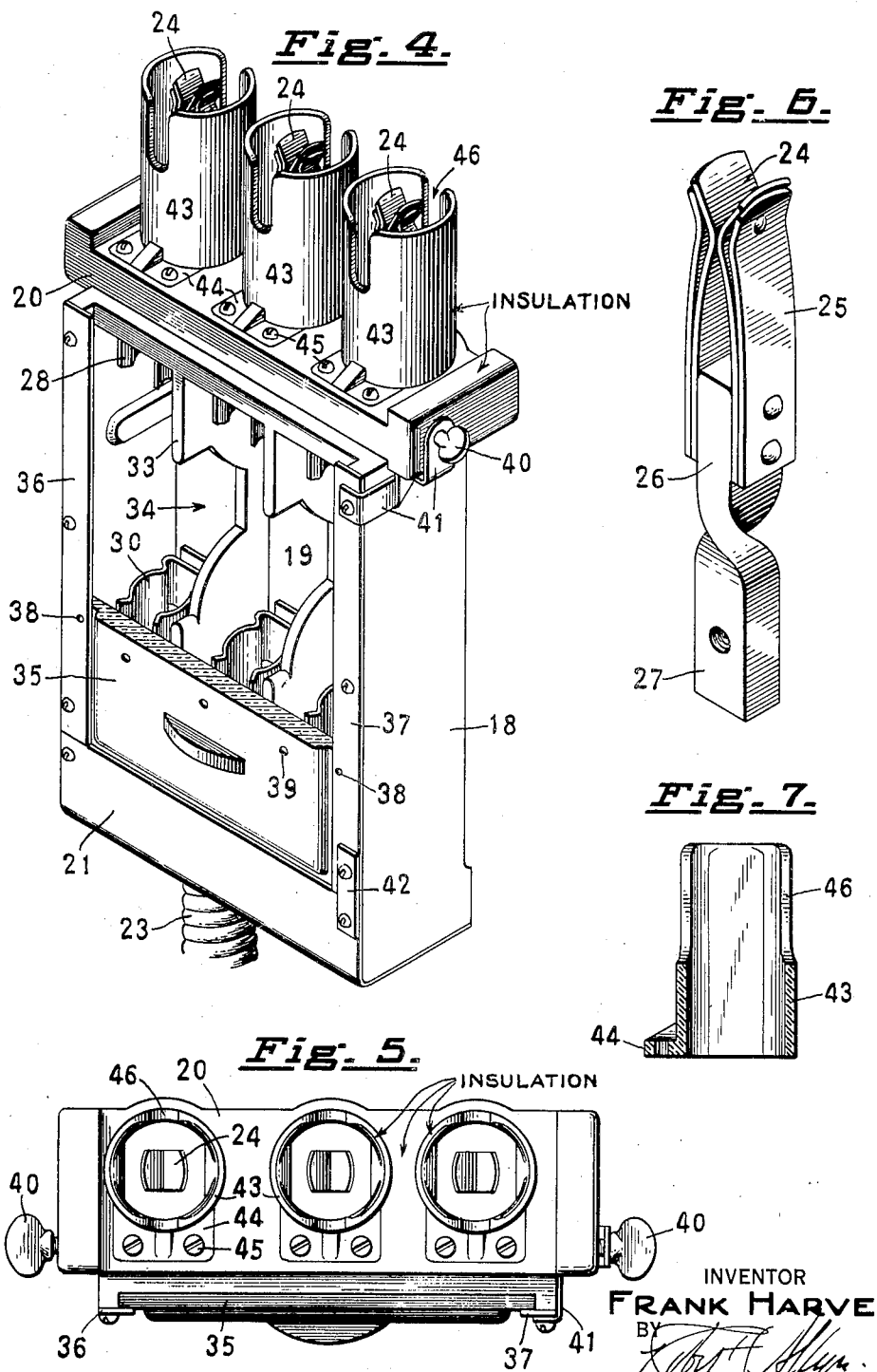
INVENTOR
FRANK HARVEY,
BY
ATTORNEY Patented Apr. 21, 1936

2,038,107

UNITED STATES PATENT OFFICE 2,038,107

ELECTRICAL CONNECTION FOR BUS BARS

Frank Harvey, Covington, Ky., assignor to The Trumbull Electric Manufacturing Company, Plainville, Conn., a corporation of Connecticut Application July 31, 1933, Serial No. 682,999

2 Claims. (Cl. 173—328)

My invention relates to conduit systems of electrical distribution and particularly to a means for making temporary connections to enclosed bus bars. In these systems bus bars are customarily mounted in metal conduits and it is desirable to be able to safely and readily tap the lines at various places in order to provide connection to various power consuming devices. These systems commonly employ two or more bus bars mounted in the same conduit and the main object of my invention is to provide a portable device of the plug-in type which may be readily inserted into the conduit to simultaneously engage the respective bus bars.

A special object of my invention is to provide a plug connector of this character which is so constructed that it has a maximum factor of safety in handling and against accidental short circuits or grounds.

Another object is to provide a construction of this character which can be readily connected with assurance of the correct polarity.

Another object is to provide a single rugged type of construction by means of which the metal portion of the casing of the plug connector may be grounded when in use.

In carrying out the invention I provide a plug type connector or distribution box having projecting contacts which are adapted to be inserted through openings in a wall of the conduit to engage the respective bus bars.

The casing of this distribution box is preferably formed of insulating material for enclosing fuses or other forms of circuit protecting devices and is provided with insulating sleeves for surrounding the projecting circuit terminals, the sleeves being spaced in such a manner that when the cover of the conduit is properly in place on the conduit it is impossible for the circuit terminals to be brought in contact with anything except the correct polarity bus bars.

Fig. 4 is a perspective view of a plug connector embodying my invention, some of the parts being broken away.

Fig. 5 is an end view of the plug connector.

Fig. 6 is a perspective view of one of the electrical terminals for engaging a bus bar.

Fig. 7 is a sectional view of one of the terminal protecting sleeves.

Figure 1:
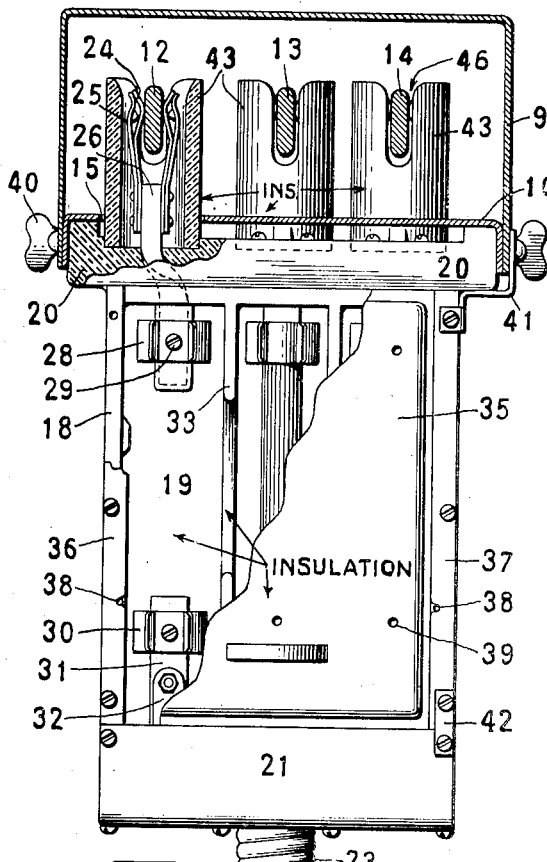
Fig. 1 is a front view of a connector embodying my invention shown inserted into a bus bar conduit, the conduit bus bars and part of the plug-in device being shown in section.

The conduit may be of any suitable construction and in the form shown consists of a main channel-like body portion 9 with a closure plate 10, these parts being adapted to be secured together, for instance, by bolts 11 at various intervals.

Within the conduit are mounted bus bars such as 12, 13 and 14 which are supported in any suitable manner, the center bar being preferably nearer one of the side bars than the other.

The closure plate 10 is provided at various places along its length with sets of openings 15 in line with the respective bus bars. The openings of each group may conveniently be closed by a cover plate 16 when no plug connector is being used at that particular point. This cover plate may be held in place in any convenient manner as, for instance, by means of screws such as 17 which pass through key hole slots in the plate 16 and screw into the closure plate 10.

The connector or distribution box 18 is preferably formed of insulating material with an integral back wall 19 and a top wall 20. The bottom of the box is formed by an angle plate 21 which has a knock-out 22 at such point as it may be convenient to attach a distribution cable or conduit 23.

At the top of the box are mounted circuit terminal jaws 24 which are of the spring type adapted to engage the respective bus bars. These contacts 24 may be reinforced by springs 25. The contacts and springs of each of the plug terminals are secured to the upper end of an anchorage bar 26 which may be twisted intermediate its length and has its lower end 27 molded into the upper wall 20 of the box. This twisting of the anchorage bar brings the ends into the most convenient position for the respective functions and at the same time provides a more secure anchorage in the molded insulation.

Inside the box are arranged jaws or clips or other mounting devices for receiving circuit protecting fuses or the like. These mounting devices may have any suitable type of clips such as clip 28 which is secured to the foot 27 of one of the plug contacts by means of a screw 29, which thus electrically connects the clip to the anchorage bar electrically and mechanically. A lower fuse clip 30 is similarly secured to an anchorage plate 31 to which is connected the distribution circuit terminal 32.

Preferably the adjacent pairs of fuse clips are separated by insulating walls 33 which thus form individual compartments for the respective fuses. These partitions or walls 33 may be cut away at 34 to facilitate insertion and removal of the fuses.

The box is open at the front and is provided with a sliding cover 35 which is supported by the front edge of the wall 20 and the partitions 33 and is held in place by the marginal strips 36 and 37. The edges of the metal side strips may be indented as at 38 so as to afford resilient frictional engagement to aid in holding the cover in position. The cover may also be provided with outlets or vents 39 to permit testing of the fuses and the circuit without removing the device from its connected position.

Figure 2:
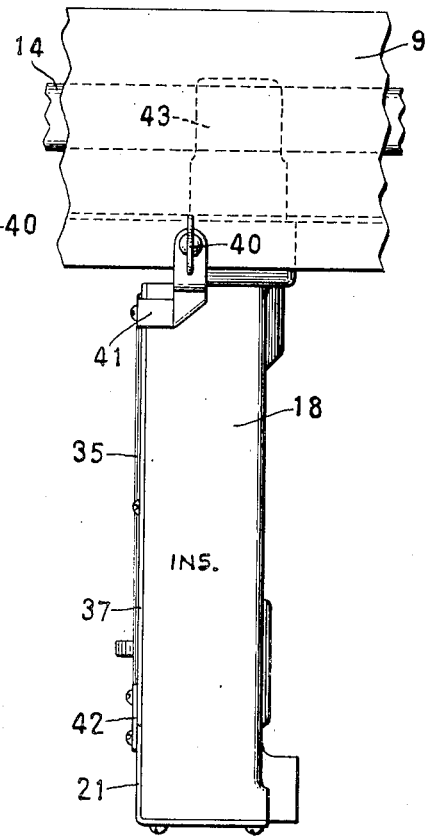
Fig. 2 is a side view of the same construction.
Figure 3:
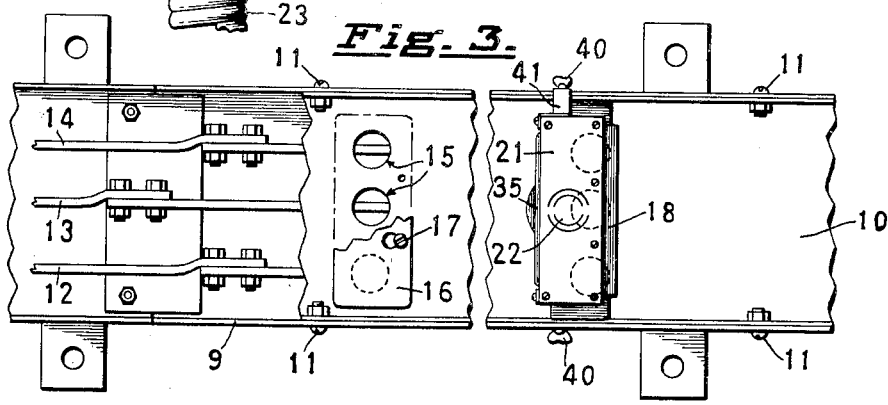
Fig. 3 shows fragments of a conduit with elements embodying my invention, some of the parts being broken away to show the interior construction.

While the spring arms 24 afford sufficient gripping power to support the plug connector and attached cable under ordinary circumstances, I also preferably provide thumb screws 40 which are adapted to be screwed through the walls of the conduit into the edges of the top wall 20, as shown in Figs. 1 and 2 to afford additional security against accidental detachment. These thumb screws also provide a grounded connection between the strips 41 and 42, strips 36 and 37, and the side walls of the conduit.

To facilitate the positioning of the connector with respect to the bus bar conduit the upper end of the connector body or box is preferably made of a width to fit between the flanges of the conduit as shown in Fig. 1.

In order to guard the terminals 24 from improper contact with the bus bars I provide guard sleeves 43 which are formed of insulating material. Each sleeve is provided with a flange 44 which fits in a recess in the upper end of the wall 20 and is secured in place by one or more screws 45.

Each sleeve is slotted at its upper end 46 so as to allow the contact 24 to engage the corresponding bus bar when the ends of the sleeves are inserted through the respective openings 15.

It will be seen that the bus bar 13 is arranged nearer to the bar 14 than it is to the bar 12. As the protecting sleeves are arranged substantially concentric with the respective contact terminals there is more space at one side of the center sleeve than at the other. Consequently by reason of this spacing arrangement of the sleeves it is impossible to insert the sleeves into the openings in the conduit except in the proper polarity relation.

The sleeves 43 are preferably made detachable so that in case of fracture or other injury any one of them or all of them may be readily replaced. This also facilitates inspection and repair of the contact terminals.

I claim:

1. A plug connector for bus bars including a one-piece box-like body formed of molded insulation with side walls and partitions and an integral end wall and open at one face, terminal anchorage bars molded in the end wall, a projecting contact connected to each anchorage bar, and a protecting insulating sleeve surrounding each contact and projecting beyond the end of each contact, the various sleeves being positioned in a line with respect to each other.

2. A plug connector for a bus bar distributing system including an insulating support, a conductor projecting through said support, a spring clip secured to said conductor for cooperation with opposite sides of a bus bar, an insulating tubular barrier surrounding the projecting end of said conductor and clip and held by said support against movement longitudinally and laterally of a bus bar received by said clip, said barrier being provided with open ended opposite slots in which the bus bar may extend and being of heavy insulating material with the upper ends of said slots diverging to constitute a guide for relative engaging movement between the clip and bus bar.

FRANK HARVEY.